US005676790A

United States Patent [19]

Burrows

[11] Patent Number: 5,676,790

[45] Date of Patent: Oct. 14, 1997

[54] CORRUGATING MACHINE WITH THERMAL POSITION SENSING

[75] Inventor: James M. Burrows, Plainfield, Ill.

[73] Assignee: Copar Corporation, Burbank, Ill.

[21] Appl. No.: 622,569

[22] Filed: Mar. 25, 1996

[51] Int. Cl.[6] .................... B32B 31/00; B31F 1/28

[52] U.S. Cl. .................... 156/353; 156/64; 156/210; 156/267; 156/269; 156/378; 156/470; 156/510

[58] Field of Search .................... 156/64, 353, 378, 156/470, 210, 267, 269, 350, 510; 226/45

[56] References Cited

U.S. PATENT DOCUMENTS

| | | | |
|---|---|---|---|
| 3,004,880 | 10/1961 | Lord | 156/64 |
| 3,127,292 | 3/1964 | Early | 156/64 |
| 3,829,338 | 8/1974 | Hayasi et al. | 156/64 |
| 3,966,518 | 6/1976 | Ferara | 156/64 |
| 3,967,994 | 7/1976 | Langberg | 156/378 |
| 3,970,489 | 7/1976 | Schmidt et al. | 156/64 |
| 3,981,758 | 9/1976 | Thayer et al. | 156/64 |
| 4,181,847 | 1/1980 | Buschmann et al. | 235/92 CC |
| 4,306,151 | 12/1981 | Chase | 250/341 |
| 4,550,377 | 10/1985 | Craemer | 364/471 |
| 4,733,078 | 3/1988 | Sturm | 250/339 |
| 5,049,216 | 9/1991 | Shead et al. | 156/64 |
| 5,437,749 | 8/1995 | Pipkorn et al. | 156/64 |
| 5,527,408 | 6/1996 | Allen | 156/64 |

*Primary Examiner*—Michele K. Yoder
*Attorney, Agent, or Firm*—Marshall, O'Toole, Gerstein, Murray & Borun

[57] ABSTRACT

A corrugating machine for producing single-faced or double-faced corrugated board which utilizes a thermal sensing system to determine the length of the web in the bridge instead of an ink-based sensing system. The corrugating machine includes means for supplying a first paper web, means for corrugating a second paper web to produce a corrugated paper web, and means for adhering the first paper web to the corrugated paper web to form a single-faced corrugated web. The corrugating machine has a splicer for splicing one of the paper webs at a splice point, means for applying a liquid spot, such as water, to one of the paper webs, and means for thermally detecting the liquid spot after the liquid spot is applied, such as a temperature detector. The corrugating machine determines the length of the single-faced corrugated web based upon when the liquid spot is applied by the applying means and when the liquid spot is thermally detected by the detecting means.

20 Claims, 4 Drawing Sheets

CORRUGATING MACHINE WITH THERMAL POSITION SENSING

BACKGROUND OF THE INVENTION

The present invention is directed to a corrugating machine for producing single-faced, double-faced or multi-wall corrugated board having a mechanism for automatically determining the length of the web material in the bridge of the machine.

Conventional corrugating machines produce double-faced corrugated board from two continuous webs of flat paper and a third continuous web of corrugated paper. In one prior art corrugating machine, a web of paper is corrugated by a pair of corrugating rollers and glued to a web of flat paper to produce a single-faced corrugated web, which is supplied to the bridge of the corrugating machine.

Each of the paper webs used to form the single-faced corrugated web is fed from a large roll of paper, which periodically runs out. As one of the paper rolls runs out of paper, a paper web from a new roll is spliced onto the paper web from the old roll via a conventional splicer. To accommodate the splicing of the new roll to the old roll, the portion of the corrugating machine which produces single-faced corrugated board may be slowed somewhat; consequently, the speed at which the single-faced corrugated web is provided to the bridge is variable.

The single-faced corrugated web is removed from the bridge of the corrugating machine and is bonded to a third web of paper to produce double-faced corrugated web, which is then supplied to a conventional cutter which cuts the double-faced corrugated web into desirable sizes.

When one of the paper webs from which the single-faced corrugated board is produced is spliced by one of the splicers, the web portion in which the splice is made is twice as thick as usual due to overlap of the original paper web with the new paper web. This extra-thick web portion is undesirable and is automatically cut out by the cutter (which may be the main cutter or an auxiliary cutter) after the double-faced corrugated web is produced.

The prior art corrugating machine described above incorporates a method of automatically cutting out the extra-thick web portion based upon a procedure which periodically determines the length of the web that was in the bridge portion of the corrugating machine. Since the single-faced corrugated web was supplied to the bridge at a variable rate and removed from the bridge at a variable rate, the length of the web in the bridge at any time was variable.

In the prior art method, the length of the web in the bridge was determined, and then the total length of the web from one of the splicers to the cutter was determined based thereon (the length of the web from one of the splicers to the bridge was a known constant, and the length of the web from the bridge to the cutter was a known constant). As soon as a splice was made, the corrugating machine would start measuring the web length from the splicer to the cutter. When the measured web length was slightly less than the total web length, the cutter would make a first cut, wait for a period of time or a distance, and then make a second cut, so that the extra-thick spliced portion of the web would be cut out from the web.

In the prior art method of determining the length of the web in the bridge, an ink mark was sprayed onto a portion of the single-faced corrugated web just prior to its entry into the bridge. An ink mark detector was positioned at the exit of the bridge, and a measuring wheel that abutted against the single-faced corrugated web generated a plurality of counts in direct proportion to the travel of the single-faced corrugated web. The length of the single-faced web in the bridge was determined based on the number of pulses that were generated by the measuring wheel between the time the ink mark was sprayed and the time the ink mark was later detected by the detector. This manner of determining the length of the single-faced corrugated web in the bridge is generally advantageous in that it allows the splice to be precisely cut out, without the need to cut out adjacent portions of the web which are acceptable.

Other methods of determining the length of the web in the bridge, such as the use of metal foil pieces which are adhesively applied to the web, are relatively expensive and have other disadvantages including maintenance problems.

SUMMARY OF THE INVENTION

The invention is directed to a corrugating machine for producing single-faced or double-faced corrugated board which utilizes a thermal sensing system to determine the length of the web in the bridge instead of an ink-based sensing system, which is advantageous since the need to spray ink onto the corrugated web in the prior art method is not optimal since ink is relatively expensive, since it can be relatively messy in use, since it leaves an undesirable ink stain on the corrugated board, and since it can cause maintenance problems.

A corrugating machine in accordance with the invention includes means for supplying a first paper web, means for corrugating a second paper web to produce a corrugated paper web, and means for adhering the first paper web to the corrugated paper web to form a single-faced corrugated web. The corrugating machine has a splicer for splicing one of the paper webs at a splice point, means for applying a liquid, such as water, to a spot or location on one of the paper webs, and means for thermally detecting the liquid after the liquid is applied, such as a temperature detector. The corrugating machine determines the length of the single-faced corrugated web based upon when the liquid is applied by the applying means and when the spot at which the liquid was applied is thermally detected by the detecting means.

The means for determining the length of the single-faced corrugated web may include means for generating a plurality of pulses corresponding to the length of the single-faced corrugated web, means for starting a count of the pulses when the liquid is applied, means for stopping the count of the pulses when the spot at which the liquid was applied is detected, and means for determining the variable length of the single-faced corrugated web based on the pulse count.

The corrugating machine may also include means for supplying a third paper web, means for bonding the third paper web to the single-faced corrugated web to form a double-faced corrugated web, and means for cutting out a portion of the double-faced corrugated web at the splice point based upon the length of the single-faced corrugated web.

Where water or another colorless liquid is used, a corrugating machine in accordance with the invention is advantageous in that the water spots evaporate completely, leaving no objectionable mark on the paper web.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1A:
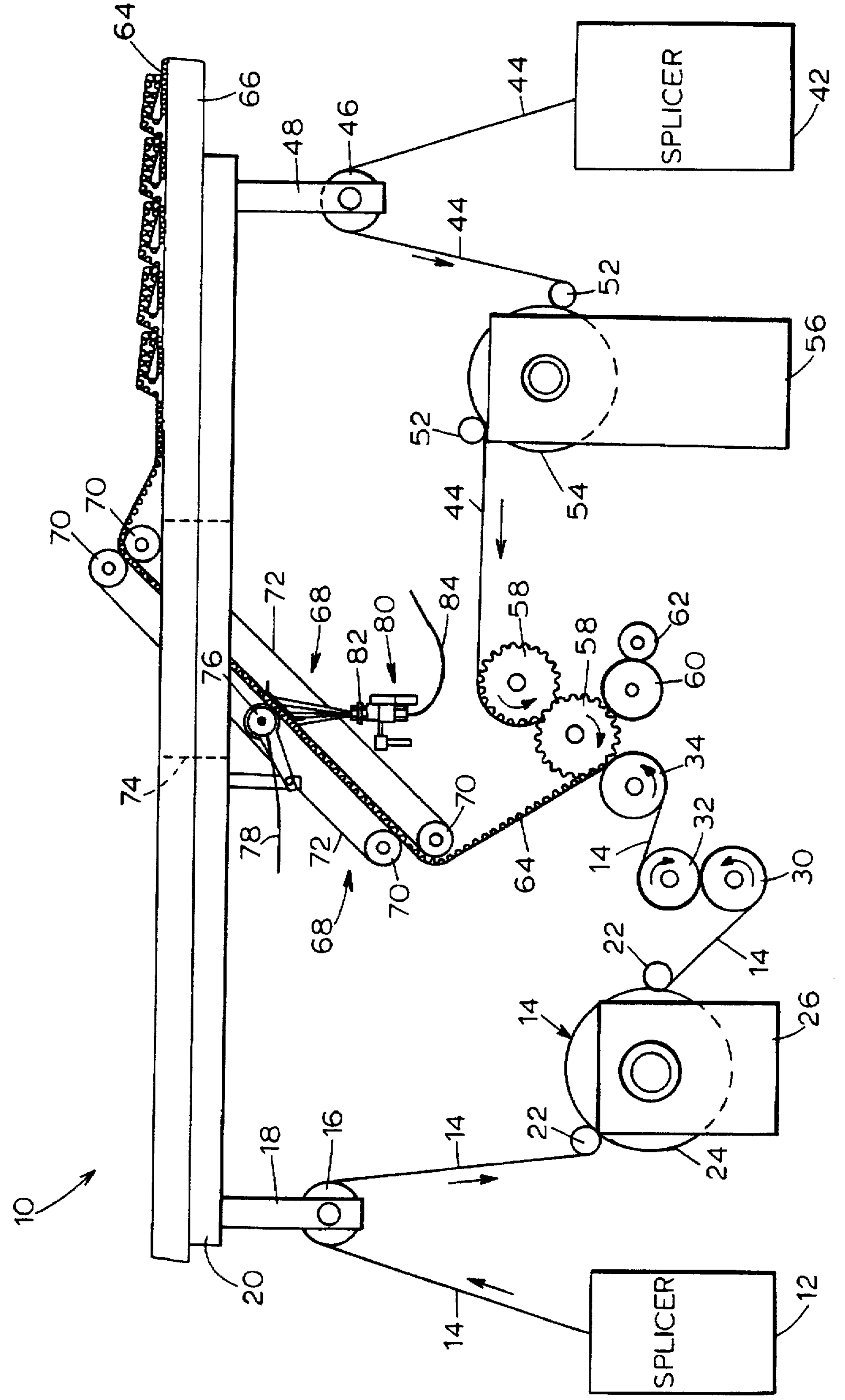
FIG. 1A is a schematic side view of a first portion of a corrugating machine in accordance with the invention.

FIG. 1A illustrates a first portion of a preferred embodiment of a corrugating machine 10 in accordance with the invention. Referring to FIG. 1A, the corrugating machine 10 includes a conventional splicer 12 which supplies a paper web 14 from a paper roll (not shown) to a cylindrical idler roller 16 rotatably supported by a support member 18 attached to a frame portion 20. The paper web 14 passes underneath a pair of cylindrical rollers 22 and over a top portion of a large pre-heating roller 24 supported by a frame portion 26. The web 14 passes underneath a lower roller 30, between the roller 30 and an upper roller 32, and to the underside of a roller 34.

The corrugating machine 10 includes a second conventional splicer 42 which supplies a paper web 44 from a paper roll (not shown) to a cylindrical idler roller 46 rotatably supported by a support member 48 attached to the frame portion 20. The paper web 44 passes underneath a pair of cylindrical rollers 52 and over a top portion of a large pre-conditioner roller 54 supported by a frame portion 56. The web 44 passes between a pair of corrugating rollers 58, each of which has a fluted corrugating surface, which corrugate the web 44. An adhesive is applied to the top portions of the corrugated web 44 via a conventional apparatus in the form of a pair of adhesive applicator rollers 60, 62.

The paper web 14 is adhesively bonded to the corrugated web 44 when the webs 14, 44 come into contact together at the junction of the rollers 34, 58 so that a single-faced corrugated web 64 is formed. The web 64 is transported to a bridge 66 via a conveyor mechanism composed of a pair of conveyors 68, each of which has a pair of rollers 70 which support a respective conveyor belt 72, with the web 64 passing between the conveyor belts 72 through an aperture 74 formed in the bridge 66. The conveyor mechanism supplies the web 64 to the bridge 66 at a rate which may be about seven times greater than the speed at which the web 64 is conveyed along the bridge 66 by a number of bridge conveyor belts (not shown). When supplied to the bridge 66, a portion of the web 64 may automatically fold over itself a number of times as shown in FIG. 1A.

As it passes between the conveyor belts 72, the single-faced corrugated web 64 makes non-slip contact with a measuring wheel 76 that rolls along the top surface of the web 64 and generates a number of electrical pulses on a line 78, each pulse corresponding to a given length of the web 64. For example, the measuring wheel 76 may generate 10 pulses for each foot or meter of the web 64 that passes underneath it.

The single-faced corrugated web 64 may be selectively sprayed with water at a spot or location on the web 64 via a spraying apparatus 80 with a spray nozzle 82 upon the receipt of an electrical spray signal generated on a line 84.

Figure 1B:
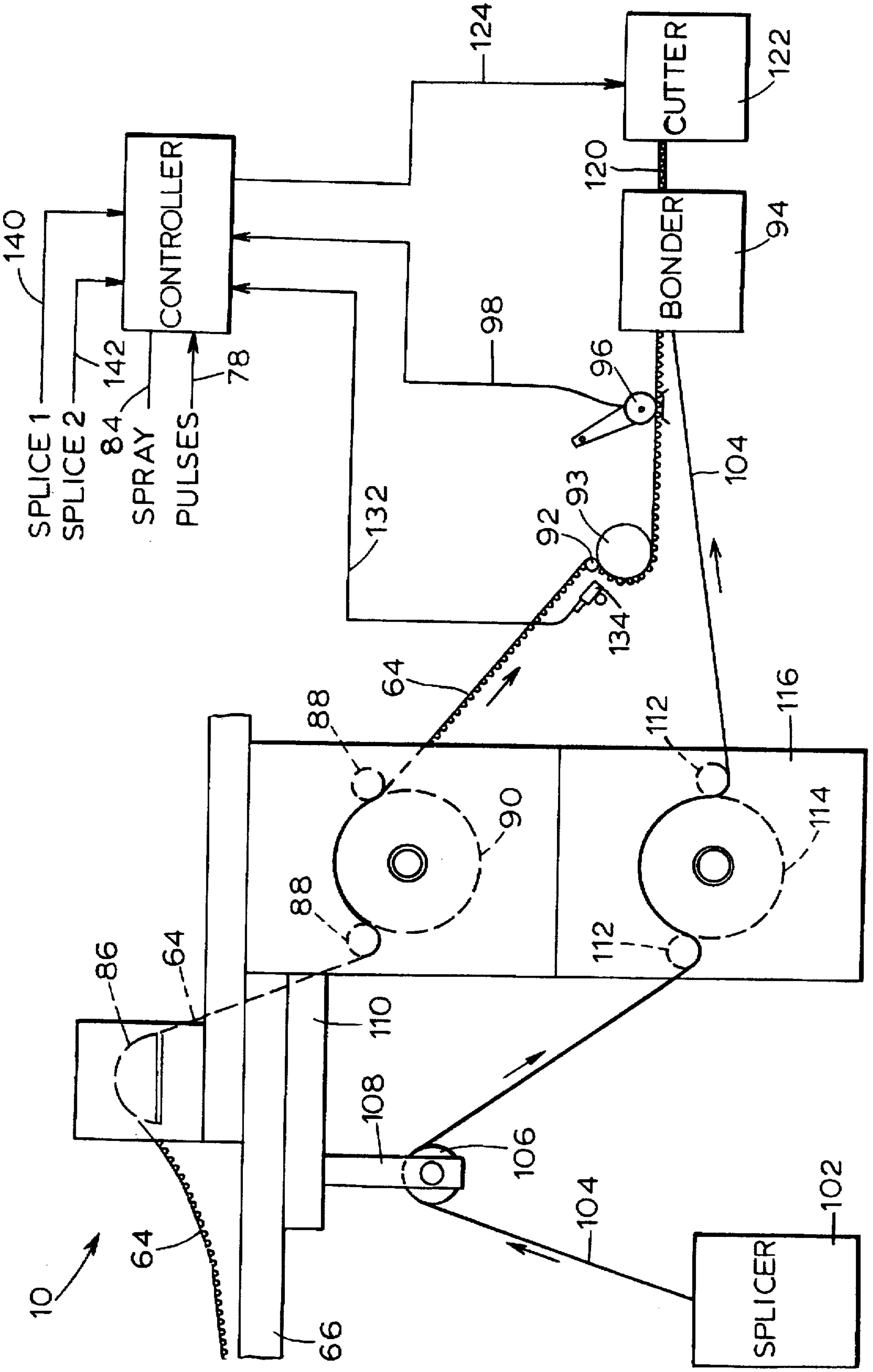
FIG. 1B is a schematic side view of a second portion of a corrugating machine in accordance with the invention.

A second portion of the corrugating machine 10 is illustrated in FIG. 1B. Referring to FIG. 1B, the single-faced corrugated web 64 passes from the bridge 66 to a curved web support 86 and then beneath a pair of rollers 88 and over the top portion of a large pre-heater roller 90, from which it passes to a small roller 92 disposed adjacent a larger roller 93 and to a bonding machine 94. The bonding machine 94 is conventional and may include a pair of adhesive applicator rollers like the rollers 60, 62 which apply adhesive to the corrugated portions of the single-faced web 64 and a pair of rollers through which the web 64 passes along with a third web after adhesive is applied.

The length of the web 64 which leaves the bridge 66 is measured by a second measuring wheel 96 which rolls along the top surface of the web 64 and generates a number of electrical pulses on a line 98, each pulse corresponding to a given length of the web 64. The measuring wheel 96 could be provided at different locations within the corrugating machine 10.

A third splicer 102 supplies a third paper web 104 from a paper roll (not shown) to a cylindrical roller 106 rotatably supported by a support member 108 attached to a frame portion 110. The paper web 104 passes underneath a pair of cylindrical rollers 112, over a top portion of a large roller 114 supported by a frame portion 116, and to the bonding machine 94 where it is bonded to the single-faced corrugated web 64 to form a double-faced corrugated web 120. The double-faced corrugated web 120 is provided to a cutter 122, which selectively cuts the web 120 into pieces of desired size, in accordance with electrical signals generated on a line 124 connected to a controller 130.

The controller 130 is connected to receive the electrical pulses generated on the line 98 by the measuring wheel 96 and an electrical signal generated on a line 132 by a conventional temperature detector 134 disposed directly adjacent the same side of the surface of the web 64 that was previously sprayed with the water via the nozzle 82.

The operation of the corrugating machine 10 is described below in connection with FIGS. 2 and 3, which illustrate a portion of the operation of the controller 130. The controller 130 may be composed of one or more conventional programmable logic controllers or a conventional computer system, such as a personal computer.

Figure 2:
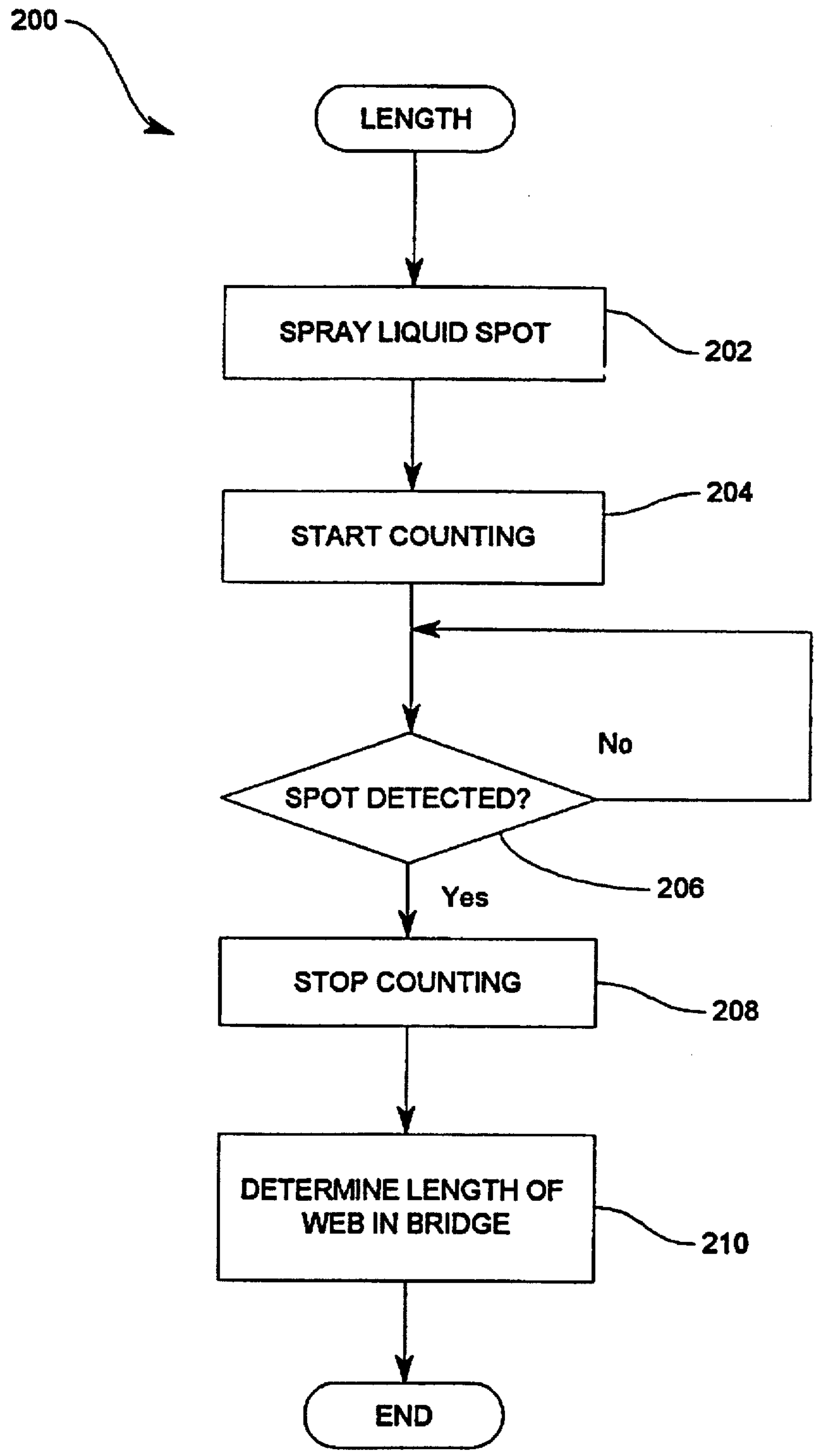
FIG. 2 is a flowchart of the method of determining the length of the web in the bridge of the corrugating machine.

FIG. 2 illustrates a procedure 200 that is periodically performed by the controller 130 to determine the length of the web 64 that is in the bridge 66. This web length may be arbitrarily defined in a number of different ways, such as the length of the web 64 from the measuring wheel 76 (FIG. 1A) to the temperature detector 134 (FIG. 1B), and is not limited to the length of the web 64 that physically lies on top of the bridge 66. The procedure 200, which may be performed every five or 10 minutes or so, for example, or a predetermined number of times between each expected splice of one of the paper webs 14, 44.

Referring to FIG. 2, the first step in the procedure 200 is step 202, at which liquid is sprayed at a spot or location on the corrugated web 64 via the nozzle 82, which is initiated by sending a SPRAY command from the controller 130 to the spray apparatus 80 via the line 84. As soon as SPRAY command is sent, at step 204 the controller 130 begins counting the number of pulses that are being generated by the measuring wheel 96. The controller 130 continues to count the number of pulses until the temperature detector 134 detects the spot at which the liquid was sprayed, as determined at step 206, at which point the controller 130 stops counting the pulses at step 208.

Since the spot at which the liquid was sprayed is cooler, due to evaporation of the liquid from the spot, than the remaining portions of the web 64, the controller 130 can determine when the spot is detected by the detector 134 by comparing the electrical signal generated by the detector 134, which is representative of the temperature of the web 64, with a predetermined temperature threshold. When the temperature sensed by the detector 134 falls below the temperature threshold, the spot at which the liquid was sprayed is detected.

At step 210, the length of the web 64 in the bridge 66 is determined based upon the number of pulses counted by the controller 130 between the spraying of the liquid and the detection of the spot. That number of pulses corresponds to the current length of the web 64 from the measuring wheel 96 to the temperature detector 134.

The length of the web in the bridge 66 periodically calculated via the procedure illustrated in FIG. 2 is used to perform a cutting procedure 220 which controls when the cutter 122 cuts out an extra-thick portion of the double-faced corrugated web 120 which is generated by a splice.

Figure 3:
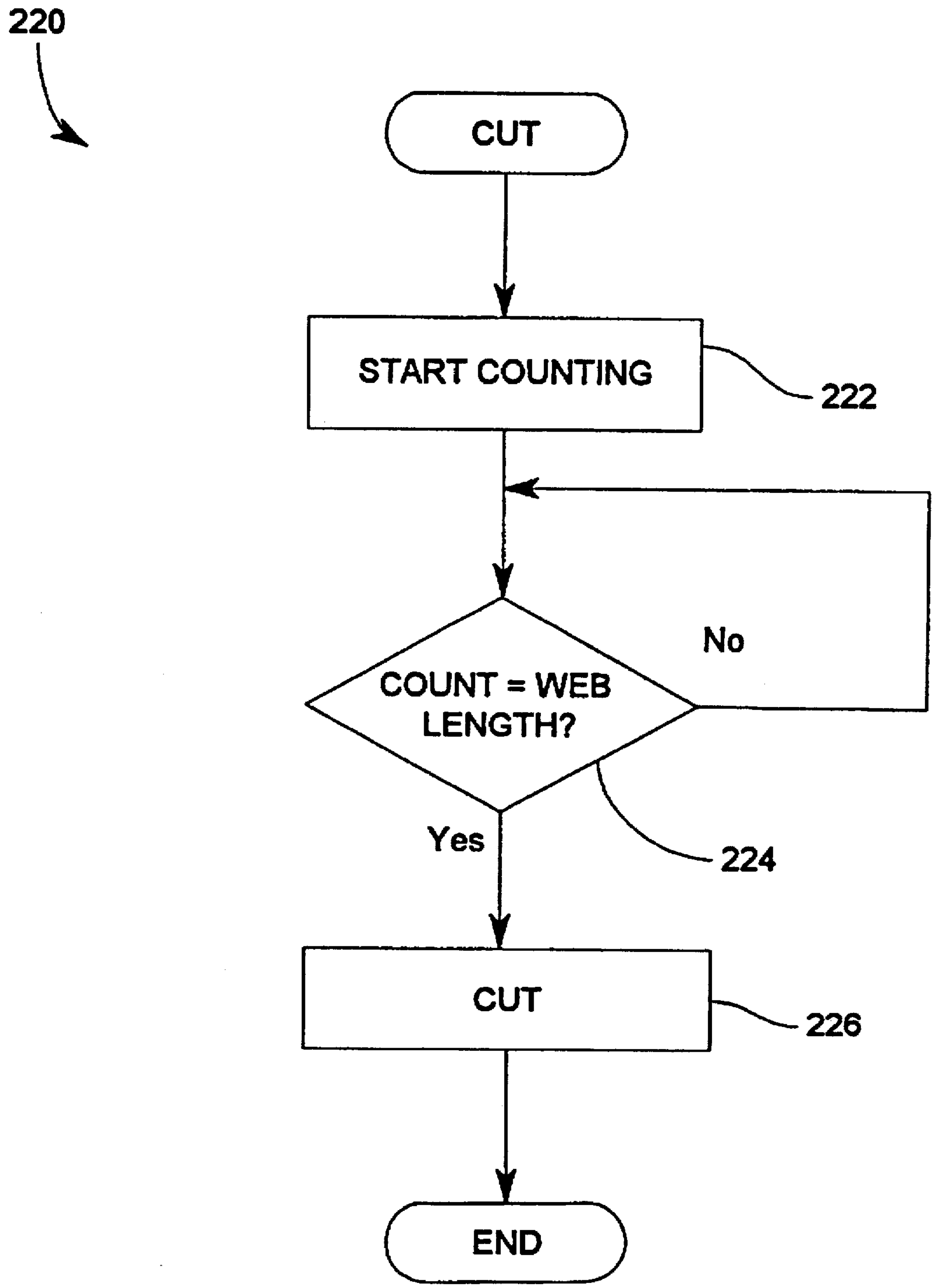
FIG. 3 is a flowchart of the method of cutting out a portion of a web which is undesirably thick due to its being spliced.

Referring to FIG. 3, when either one of the splicers 12, 42 splices a new web onto the current web, a SPLICE signal is transmitted to the controller 130 via one of a pair of lines 140, 142. As soon as the SPLICE signal is received, the controller 130 starts counting the number of pulses received from the measuring wheel 96 via the line 98.

It should be understood that the total length of the web from either of the two splicers 12, 42 to the cutter 122 is known, since the web length from one of the splicers to the bridge 66 is fixed (and corresponds to a fixed number of pulses), since the variable length of the web 64 within the bridge 66 is known (and corresponds with a given number of pulses), and since the length of the web from the bridge 66 to the cutter 122 is fixed (and corresponds to a fixed number of pulses).

At step 224, when the number of pulses being counted at step 222 reaches a predetermined number of pulses corresponding to a length slightly shorter, e.g. four inches, than the total length of the web from one of the splicers 12, 42 to the cutter 122, then at step 226 the controller 130 sends a CUT signal to the cutter 122. In response to the CUT signal, the cutter 122 makes a first cut in the double-faced corrugated web 120, waits a predetermined period of time, e.g. corresponding to eight inches of web travel, and then makes a second cut in the double-faced corrugated web 120 a predetermined distance after the first cut, so that the extra-thick spliced portion is cut out of the web 120.

It should be understood that if the fixed web length between the splicer 12 and the bridge 66 is different than the fixed web length between the splicer 42 and the bridge 66, two different pulse thresholds may be used at step 224, depending upon which of the splicers 12, 42 generated the splice. The cutter 122 also cuts out extra-thick portions of the web 120 caused by splices made by the splicer 102; however, those portions are easily identified since the splicer 102 is located a fixed web length from the cutter 122.

It should also be understood that the procedures illustrated in FIGS. 2 and 3 are only exemplary, and that different procedures could be utilized in the implementation of the invention. A number of conventional components of the corrugating machine 10 illustrated in FIGS. 1A and 1B have been omitted, such as an oven for curing the corrugated board and a stacker for stacking pieces of the corrugated board after it is cut by the cutter 122. Other conventional components could be included in the corrugating machine 10.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An apparatus for producing corrugated paper, comprising:

means for supplying a first paper web;

means for corrugating a second paper web to produce a corrugated paper web;

means for adhering said first paper web to said corrugated paper web to form a single-faced corrugated web;

means for transporting said single-faced corrugated web to a bridge in which a variable length of said single-faced corrugated web may accumulate;

means for periodically splicing one of said paper webs at a splice point;

means for applying liquid at a spot on one of said paper webs;

means for thermally detecting said spot after said liquid is applied by said applying means based on the temperature of a portion of one of said paper webs;

means for determining said variable length of said single-faced corrugated web in said bridge based upon when said liquid is applied by said applying means and when said spot is thermally detected by said detecting means; and means for cutting out a portion of said single-faced corrugated web at said splice point based upon said variable length of said single-faced corrugated web in said bridge.

2. An apparatus as defined in claim 1 wherein said means for supplying a first paper web comprises a pair of cylindrical rollers.

3. An apparatus as defined in claim 1 wherein said means for corrugating said second paper web comprises a pair of cylindrical rollers, each of said rollers having a cylindrical corrugating surface formed thereon.

4. An apparatus as defined in claim 1 wherein said means for adhering said first paper web to said corrugated paper web comprises means for applying an adhesive to said corrugated paper web.

5. An apparatus as defined in claim 1 wherein said means for transporting said single-faced corrugated web to said bridge comprises a pair of cylindrical rollers and a conveyor belt carried by said rollers.

6. An apparatus as defined in claim 1 wherein said means for applying said liquid comprises means for spraying water at a spot on said single-faced corrugated web.

7. An apparatus as defined in claim 1 wherein said means for thermally detecting said spot after said liquid is applied by said applying means comprises a temperature detector.

8. An apparatus as defined in-claim 1 wherein said single-faced corrugated web leaves said bridge at an exit speed and wherein said means for determining said variable length of said single-faced corrugated web in said bridge comprises means for generating a plurality of pulses at a rate corresponding to said exit speed of said single-faced corrugated web.

9. An apparatus as defined in claim 1 wherein said single-faced corrugated web leaves said bridge at an exit speed and wherein said means for determining said variable length of said single-faced corrugated web in said bridge comprises:

means for generating a plurality of pulses at a rate corresponding to said exit speed of said single-faced corrugated web;

means for starting a count of said pulses generated by said generating means when said liquid is applied by said applying means;

means for stopping said count of said pulses when said spot is detected by said detecting means; and means for determining said variable length of said single-faced corrugated web based on said count of said pulses.

10. An apparatus as defined in claim 1 additionally comprising:

means for supplying a third paper web; and means for bonding said third paper web to said single-faced corrugated web to form a double-faced corrugated web.

11. An apparatus for producing corrugated paper, comprising:

means for supplying a first paper web;

means for corrugating a second paper web to produce a corrugated paper web;

means for adhering said first paper web to said corrugated paper web to form a single-faced corrugated web;

means for splicing one of said paper webs at a splice point;

means for applying liquid at a spot on one of said paper webs;

means for thermally detecting said spot after said liquid is applied by said applying means; and means for determining a length of said single-faced corrugated web based upon when said liquid is applied by said applying means and when said spot is thermally detected by said detecting means.

12. An apparatus as defined in claim 11 wherein said means for supplying a first paper web comprises a pair of cylindrical rollers.

13. An apparatus as defined in claim 11 wherein said means for corrugating said second paper web comprises a pair of cylindrical rollers, each of said rollers having a cylindrical corrugating surface formed thereon.

14. An apparatus as defined in claim 11 wherein said means for adhering said first paper web to said corrugated paper web comprises means for applying an adhesive to said corrugated paper web.

15. An apparatus as defined in claim 11 additionally comprising means for transporting said single-faced corrugated web to a bridge.

16. An apparatus as defined in claim 11 wherein said means for applying said liquid comprises means for spraying water at a spot on said single-faced corrugated web.

17. An apparatus as defined in claim 11 wherein said means for thermally detecting said spot after said liquid is applied by said applying means comprises a temperature detector.

18. An apparatus as defined in claim 11 wherein said means for determining said length of said single-faced corrugated web comprises means for generating a plurality of pulses corresponding to a length of said single-faced corrugated web.

19. An apparatus as defined in claim 11 wherein said means for determining said length of said single-faced corrugated web comprises:

means for generating a plurality of pulses corresponding to a length of said single-faced corrugated web;

means for starting a count of said pulses generated by said generating means when said liquid is applied by said applying means;

means for stopping said count of said pulses when said spot is detected by said detecting means; and means for determining said variable length of said single-faced corrugated web based on .said count of said pulses.

20. An apparatus as defined in claim 11 additionally comprising:

means for supplying a third paper web;

means for bonding said third paper web to said single-faced corrugated web to form a double-faced corrugated web; and means for cutting out a portion of said double-faced corrugated web at said splice point based upon said length of said single-faced corrugated web.

* * * * *